UNITED STATES PATENT OFFICE 2,295,170

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application March 21, 1941,
Serial No. 384,602

10 Claims. (Cl. 252—341)

This invention relates primarily to the resolution of petroleum emulsions.

The main object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described which is used as the demulsifier in our improved process for resolving petroleum emulsions, is exemplified by the acidic, or preferably, the neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid, which, similarly, may conveniently be indicated as being of the dibasic type, by the formula $$HOOC.D.COOH$$

then the fractional ester obtained by reaction between equimolar quantities may be indicated by the following formula:

$$HOOC.D.COO.T$$

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

$$OH(C_2H_4O)_mH$$

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

$$OH(C_nH_{2n}O)_mH$$

in which $m$ has its previous significance and $n$ represents a numeral varying from 2 to 4.

Thus, the bulk of the demulsifying materials herein described, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

$$T.OOC.D.COOH + OH(C_2H_4O)_mH + HOOC.D.COO.T \rightarrow$$
$$T.OOC.D.COO(C_2H_4O)_{m-1}C_2H_4.OOC.D.COO.T$$

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8-12 oxyalkylene groups, particularly 8-12 oxyethylene groups. The preference to use the oxyethylated compounds is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance there may be present some oxy-ethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture the molecular weight of the glycol employed, whether a higher distillable polyethylene glycol, or a lower non-distillable polyethylene gycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic compounds employed as reactants in the manufacture of the new compounds or reagents herein described, are materials conveniently referred to as the amides of high molar alcohol acids or high molar hydroxy acids. Such amides are derived from the high molar hydroxy acids. Like the high molar hydroxy acids, they are invariably water-insoluble.

Since the amides are derivatives of the high molar hydroxy acids, it is most convenient to indicate the variety of high molar hydroxy acids which may be converted into amides or substituted amides. The commonest example of a high molal hydroxy acid is ricinoleic acid. Other hydroxy fatty acids include hydroxystearic acid, dihydroxystearic acid, diricinoleic acid, aleuritic acid, and the like. Similar acids are obtained in the oxidation of paraffin, petroleum hydrocarbons, or wax, and are commonly referred to as hydroxylated wax acids. Hydroxylated wax acids occur as by-products in the oxidation of waxes or similar materials, and are usually separated so that the commonest commercial form of oxidized wax acids represent mixtures comparatively free from the hydroxylated compounds. Hydroxylated acids are produced by other procedures, such as chlorination, either by addition or substitution, as, for example, chlorination of oleic acid or stearic acid. Subsequent reactions involve the removal of the chlorine with the introduction of a hydroxyl radical. Undecylenic acid, derived from castor oil, has been converted into a hydroxy undecenoic acid. Unsaturated hydroxy acids, such as ricinoleic acid, may be treated in various manners, so as to produce derivatives, for example, chlorinated or brominated ricinoleic acid. Such materials are entirely satisfactory for use as reactants in the preparation of materials of the kind herein contemplated. Naturally-occurring naphthenic acids can also be converted into hydroxylated products by following similar procedure. An unsaturated hydroxy acid, such as ricinoleic acid, can be converted into a hydroxylated arylstearic acid. Such procedure contemplates reactions such as those involving ricinoleic acid, benzene, and aluminum chloride in large excess, or involves the desulfonation of a sulfo-aromatic fatty acid. In any event, by employing derivatives of undecylenic acid, or one or more of the various wax acids, naturally-occurring naphthenic acid, ricinoleic acid, diricinoleic acid, or derivatives thereof, as previously explained, one can obtain a variety of hydroxylated monocarboxy acids, having at least 11 carbon atoms and not in excess of 36 carbon atoms. Such compounds are the kind herein contemplated as reactants to furnish the alcoholiform hydroxyl.

Hydroxy acids of the kind herein contemplated as reactants for the formation of amides, may also be prepared by the hydrolysis of alpha-halogen acids. For instance, alpha-bromocaproic acid, alpha-bromocaprylic acid, alpha-bromocapric acid, alpha-bromolauric acid, alpha-bromomyristic acid, alpha-bromopalmitic acid, and the like, can be hydrolyzed to give the corresponding alpha-hydroxy acid. Indeed, a reactive alpha-halogen acid may serve as a functional equivalent of an alpha-hydroxy acid by liberation of hydrochloric acid, instead of water. Such type of reaction, however, involves numerous difficulties; and thus, it is better to employ a hydroxy acid.

In some instances derivatives of hydroxylated unsaturated acids are most readily obtained by the employment of an intermediate in which the hydroxyl group is protected. Thus, ricinoleic acid may be acetylated, and such acetyl ricinoleic acid converted into a derivative, for instance, a derivative in which an aryl group is introduced. Such derivatives can then be saponified or hydrolyzed so as to regenerate the hydroxyl radical.

The manufacture of amides from acids is, of course, comparatively simple. One may employ the acid or a suitable derivative, such as the acyl halide, or preferably, the ester. In many instances it is easier to obtain the amide from an ester derived from a monohydric or polyhydric alcohol than it is from the acid itself.

As to the manufacture of various esters from acids of the kind above described, attention is directed to the following United States patents, to wit: No. 1,160,595, dated Nov. 16, 1915; to Gruter et al.; No. 2,221,674, dated Nov. 12, 1940, to Ellis; and No. 2,177,407, dated Oct. 24, 1939, to Hansley. See also Organic Syntheses, volume X, page 88.

In any event, the acid or suitable derivative, particularly the ester, is treated with ammonia to produce the amide.

The method of manufacturing the amide requires no elaboration, but simply as illustrative of the art; reference is made to U. S. Patent No. 2,058,013, to Henke and Zertman, dated October 20, 1936.

As to the procedure for manufacture of substituted amides, reference is made to the following United States patents, i. e., No. 2,013,108, dated Sept. 3, 1935, to Reppe et al.; No. 1,475,477, dated Nov. 27, 1923, Ellis; and No. 1,954,433, dated Apr. 10, 1934, Thomas et al.

If low molal amines, particularly primary amines, for example, butylamine, amylamine, aniline, cyclohexylamine, or the like, are substituted for ammonia, one obtains a substituted amide which can be employed satisfactorily in the present process, provided, of course, that the final product is water-soluble. In fact, secondary amines, such as dibutylamine and diamylamine, can be used. Since such materials are generally more expensive than ammonia, and since the hydrocarbon groups present tend to decrease water solubility, there is no added advantage in using such materials, except for some special purpose, such as the resolution of oil field emulsions. If such materials are used, it is preferable that they be derivatives of primary amines, i. e., that the substituted amide contain only one hydrocarbon group, and in any event, that such hydrocarbon group contain not more than 7 carbon atoms, as, for example, derivatives of monoamylamine, cyclo hexylamine, aniline, and benzylamine.

In the hereto appended claims reference to amides is intended to include substituted amides in which there is present not more than one hydrocarbon group containing not more than 7 carbon atoms, provided that such materials serve as obvious functional equivalents, i. e., yield water-soluble products. The hereto appended claims are not intended to include substituted amides derived from amines containing hydroxy hydrocarbon radicals, as, for example, monoethanolamine, monopropanolamine, tris(hydroxymethyl) aminomethane, monoglycerylamine, etc.

*Intermediate product, Example 1*

One pound mole of nonaethylene glycol is reacted with two pound moles of maleic anhydride so as to form nonaethylene glycol dihydrogen dimaleate.

*Intermediate product, Example 2*

A mixture of lower non-distillable polyethylene glycols, representing approximately deca- to tetradecaethylene glycol, is substituted for nonaethylene glycol in the preceding example.

*Intermediate product, Example 3*

A 50–50 mixture of nonaethylene glycol and lower non-distillable polyethylene glycols of the kind described in the previous example is substituted for nonaethylene glycol in Example 1.

*Intermediate product, Example 4*

Adipic acid is substituted for maleic anhydride in Examples 1–3 preceding.

*Intermediate product, Example 5*

Oxalic acid is substituted for maleic anhydride in Examples 1–3 preceding.

*Intermediate product, Example 6*

Citric acid is substituted for maleic anhydride in Examples 1–3 preceding.

*Intermediate product, Example 7*

Succinic anhydride is substituted for maleic anydride in Examples 1–3 preceding.

*Composition of matter, Example 1*

One pound mole of the intermediate product of the kind described in Intermediate product, Examples 1, 2 and 3, above, is reacted with two pound moles of ricinoleoamide, until substantially all dibasic carboxyl acidity has disappeared. Time of reaction may vary from a few hours to as much as 20 hours.

*Composition of matter, Example 2*

The amide of hydroxystearic acid is substituted for ricinoleoamide in the preceding example.

*Composition of matter, Example 3*

The amide of dihydroxystearic acid is substituted for ricinoleoamide in Composition of matter, Example 1.

*Composition of matter, Example 4*

The amide of chlorinated ricinoleic acid is substituted for ricinoleoamide in Composition of matter, Example 1.

*Composition of matter, Example 5*

The amide of brominated ricinoleic acid is substituted for ricinoleoamide in Composition of matter, Example 1.

*Composition of matter, Example 6*

A mixture of hydroxylated oxidized wax acids having an average molecular weight of approximately 250–275, is converted into the corresponding mixture of amides and substituted for ricinoleoamide in Composition of matter, Example 1.

*Composition of matter, Example 7*

A mixture of hydroxylated oxidized wax acids having an average molecular weight of approximately 275–300, is converted into the corresponding mixture of amides and substituted for ricinoleoamide in Composition of matter, Example 1.

*Composition of matter, Example 8*

A mixture of hydroxylated oxidized wax acids having an average molecular weight of approximately 300–325, is converted into the corresponding mixture of amides and substituted for ricinoleoamide in Composition of matter, Example 1.

*Composition of matter, Example 9*

In Composition of matter, Examples 1–8 preceding, any residual acidity present is removed by cautiously adding a dilute solution of ammonium hydroxide until the resultant product gives a clear, limpid solution in water, particularly in dilute form.

*Composition of matter, Example 10*

In Composition of matter, Examples 1–8 preceding, any residual acidity present is removed by cautiously adding a dilute solution of triethanolamine until the resultant product gives a clear, limpid solution in water, particularly in dilute form.

*Composition of matter, Example 11*

In Composition of matter, Examples 1–8 preceding, any residual acidity present is removed by cautiously adding a dilute solution of tris-(hydroxymethyl) aminomethane until the resultant product gives a clear, limpid solution in water, particularly in dilute form.

*Composition of matter, Example 12*

The same procedure is followed as in Composition of matter, Examples 1–11, inclusive, except that an intermediate product of the kind exemplified by Intermediate product, Example 4, is substituted for that in Intermediate product, Examples 1, 2 and 3.

*Composition of matter, Example 13*

The same procedure is followed as in Composition of matter, Examples 1–11, inclusive, except that an intermediate product of the kind exemplified by Intermediate product, Example 5, is substituted for that in Intermediate product, Examples 1, 2 and 3.

*Composition of matter, Example 14*

The same procedure is followed as in Composition of matter, Examples 1–11, inclusive, except that an intermediate product of the kind exemplified by Intermediate product, Example 6, is substituted for that in Intermediate product, Examples 1, 2 and 3.

*Composition of matter, Example 15*

The same procedure is followed as in Composition of matter, Examples 1–11, inclusive, except that an intermediate product of the kind exemplified by Intermediate product, Example 7, is substituted for that in Intermediate product, Examples 1, 2 and 3.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent, which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound in which the adjacent acid and glycol nucleus occur as a structural unit. For instance, in the monomeric form this may be indicated in the following manner:

acid . . . . . glycol . . . . . acid.

If, however, one prepared an intermediate product employing the ratio of three moles of maleic anhydride and two moles of nonaethylene glycol, the tendency would be to produce a product which might be indicated in the following manner:

acid . . . glycol . . . acid . . . glycol . . . acid.

Similarly, three moles of the glycol and four moles of the acid might tend to give a combination which may be indicated thus:

acid . . . glycol . . . acid . . . glycol . . . acid . . . glycol . . . acid.

Another way of stating the matter is that the composition may be indicated in the following manner:

$$TOOC.D.COO[C_2H_4O]_{m-1}C_2H_4OOC.D.COO]_xT$$

in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid;

(d) By using an alcoholic material of lower molecular weight, for instance, ricinoleoamide, instead of the amide of a hydroxylated wax acid of a higher molecular acid, or instead of a substituted amide, such as amyl ricinoleoamide.

In any event, it is to be noted that the compounds of the type herein contemplated are limited to the water-soluble type, i. e., those which are self-emulsifying in water, or produce a sol or a molecular solution.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances gives increased resistance, to soluble calcium and magnesium salts, for such property is of particular value. Usually, however, neutralization with a dilute solution of ammonia or the like is just as practicable and less expensive.

Having thus described our invention, what we claim as new and desire to secure by Letters Patent is:

1. A process for breaking water-in-oil emulsions, characterized by subjecting the emulsion to the action of a demulsifier comprising a water-soluble esterification product derived by reaction between one mole of a polybasic compound and two moles of a water-insoluble amide of a high molar hydroxy acid having at least 11 carbon atoms and not more than 36 carbon atoms; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol.

2. A process for breaking water-in-oil emulsions, characterized by subjecting the emulsion to the action of a demulsifier comprising a neutral water-soluble esterification product derived by reaction between one mole of a polybasic compound and two moles of a water-insoluble amide of a high molar hydroxy acid having at least 11 carbon atoms and not more than 36 carbon atoms; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol.

3. A process for breaking water-in-oil emulsions, characterized by subjecting the emulsion to the action of a demulsifier comprising a neutral water-soluble esterification product derived by reaction between one mole of a dibasic compound and two moles of a water-insoluble amide of a high molar hydroxy acid having at least 11 carbon atoms and not more than 36 carbon atoms; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol.

4. A process for breaking water-in-oil emulsions, characterized by subjecting the emulsion to the action of a demulsifier comprising a neutral water-soluble esterification product derived by reaction between one mole of a dibasic compound and two moles of a water-insoluble amide of a high molar hydroxy acid having at least 11 carbon atoms and not more than 36 carbon atoms; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol.

5. A process for breaking water-in-oil emulsions, characterized by subjecting the emulsion to the action of a demulsifier comprising a neutral water-soluble esterification product derived by reaction between one mole of a dibasic compound and two moles of a water-insoluble amide in which the acyl radical contains 18 carbon atoms and at least one hydroxyl radical; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol.

6. A process for breaking water-in-oil emulsions, characterized by subjecting the emulsion to the action of a demulsifier comprising a neutral, water-soluble chemical compound of the formula type:

TOOC.D.COO[(C₂H₄O)ₘC₂H₄OOC.D.COO]ₓT in which T is a radical derived by dehydroxylation of ricinoleoamide; OOC.D.COO is the acid radical derived from a dibasic acid by removal of the acidic hydrogen atoms; said acid radical having not over 6 carbon atoms; m represents a numeral varying from 7 to 12; and x is a small whole number less than 10.

7. A process for breaking water-in-oil emulsions, characterized by subjecting the emulsion to the action of a demulsifier comprising a neutral, water-soluble chemical compound of the formula type:

TOOC.D.COO(C₂H₄O)ₘC₂H₄OOC.D.COO.T in which T is a radical derived by dehydroxylation of ricinoleoamide; OOC.D.COO is the acid radical derived from a dibasic acid by removal of the acidic hydrogen atoms; said acid radical having not over 6 carbon atoms; and m represents a numeral varying from 7 to 12.

8. A process for breaking water-in-oil emulsions, characterized by subjecting the emulsion to the action of a demulsifier comprising a neutral water-soluble chemical compound of the formula type:

TOOC.D.COO(C₂H₄O)ₘC₂H₄OOC.D.COO.T in which T is a radical derived by dehydroxylation of ricinoleoamide; OOC.D.COO is the acid radical derived from maleic acid by removal of the acidic hydrogen atoms; and m represents a numeral varying from 7 to 12.

9. A process for breaking water-in-oil emulsions, characterized by subjecting the emulsion to the action of a demulsifier comprising a neutral water-soluble chemical compound of the formula type:

TOOC.D.COO(C₂H₄O)ₘC₂H₄OOC.D.COO.T in which T is a radical derived by dehydroxylation of ricinoleoamide; OOC.D.COO is the acid radical derived from succinic acid by removal of the acidic hydrogen atoms; and m represents a numeral varying from 7 to 12.

10. A process for breaking water-in-oil emulsions, characterized by subjecting the emulsion to the action of a demulsifier comprising a neutral water-soluble chemical compound of the formula type:

TOOC.D.COO(C₂H₄O)ₘC₂H₄OOC.D.COO.T in which T is a radical derived by dehydroxylation of ricinoleoamide; OOC.D.COO is the acid radical derived from adipic acid by removal of the acidic hydrogen atoms; and m represents a numeral varying from 7 to 12.

MELVIN DE GROOTE.
BERNHARD KEISER.